(12) United States Patent
Mottur

(10) Patent No.: US 7,382,397 B2
(45) Date of Patent: Jun. 3, 2008

(54) SYSTEMS AND METHODS FOR CONTROLLING DEVICES OVER A NETWORK

(75) Inventor: Peter A. Mottur, Portsmouth, RI (US)

(73) Assignee: Smiths Detection, Inc., Middletown, RI (US)

( * ) Notice: Subject to any disclaimer, the term of this patent is extended or adjusted under 35 U.S.C. 154(b) by 613 days.

(21) Appl. No.: 10/301,346

(22) Filed: Nov. 21, 2002

(65) Prior Publication Data

US 2004/0163118 A1 Aug. 19, 2004

Related U.S. Application Data

(63) Continuation-in-part of application No. 09/912,869, filed on Jul. 25, 2001.

(60) Provisional application No. 60/332,561, filed on Nov. 21, 2001, provisional application No. 60/355,178, filed on Feb. 8, 2002, provisional application No. 60/221,674, filed on Jul. 26, 2000.

(51) Int. Cl.
*H04N 7/18* (2006.01)

(52) U.S. Cl. ............... 348/142; 348/153; 348/159; 725/105

(58) Field of Classification Search ........ 348/142–160, 348/211–214; 725/103–109
See application file for complete search history.

(56) References Cited

U.S. PATENT DOCUMENTS

| | | | |
|---|---|---|---|
| 5,111,291 A | 5/1992 | Erickson et al. ........... 358/108 |
| 5,467,402 A | 11/1995 | Okuyama et al. .......... 382/104 |
| 5,473,368 A * | 12/1995 | Hart ........................... 348/155 |
| 5,515,099 A | 5/1996 | Cortjens | |
| 5,600,368 A | 2/1997 | Matthews, III | |
| 5,619,183 A | 4/1997 | Ziegra et al. ............... 340/505 |
| 5,625,410 A | 4/1997 | Washino et al. ........... 348/154 |
| 5,717,379 A | 2/1998 | Peters ........................ 340/539 |
| 5,729,471 A | 3/1998 | Jain et al. | |
| 5,761,280 A | 6/1998 | Noonen et al. .......... 379/93.27 |
| 5,812,054 A | 9/1998 | Cohen ........................ 340/506 |
| 5,815,080 A | 9/1998 | Taguchi ..................... 340/635 |
| 5,838,368 A | 11/1998 | Masunaga et al. ......... 348/211 |
| 5,838,682 A | 11/1998 | Dekelbaum et al. ....... 370/401 |
| 5,903,455 A | 5/1999 | Sharpe, Jr. et al. | |
| 5,917,405 A | 6/1999 | Joao ........................... 340/426 |
| 511,291 A | 9/1999 | Erickson et al. ........... 348/153 |
| 5,987,519 A | 11/1999 | Peifer et al. ............... 709/230 |
| 6,008,837 A | 12/1999 | Yonezawa | |
| 6,075,553 A | 6/2000 | Freeman .................... 348/15 |

(Continued)

FOREIGN PATENT DOCUMENTS

GB 2 325 5483 11/1998

*Primary Examiner*—Anand S. Rao
(74) *Attorney, Agent, or Firm*—Foley & Lardner LLP

(57) ABSTRACT

Methods and systems that include providing at least one controlled region, at least one controlled region device associated with the controlled region(s), and a processor-controlled user device, the user device having an interface by which a user can select one of controlled region devices, and provide variable speed control commands over a network to the selected controlled region device. The controlled region device can be a device that can be controlled at least in part, based on pan and tilt commands, including devices mounted on a pan/tilt head. Example devices include a camera, an antenna, and a spotlight.

42 Claims, 8 Drawing Sheets

U.S. PATENT DOCUMENTS

| | | | |
|---|---|---|---|
| 6,128,298 A | 10/2000 | Wootton et al. | 370/392 |
| 6,185,601 B1 | 2/2001 | Wolff | 709/203 |
| 6,226,031 B1 | 5/2001 | Barraclough et al. | 348/14.13 |
| 6,243,129 B1 | 6/2001 | Deierling | 348/15 |
| 6,271,752 B1 | 8/2001 | Vaios | 340/541 |
| 6,271,805 B1 | 8/2001 | Yonezawa | 345/1 |
| 6,292,098 B1 | 9/2001 | Ebata et al. | 340/506 |
| 6,414,716 B1 * | 7/2002 | Kawai | 348/211.3 |
| 6,529,234 B2 * | 3/2003 | Urisaka et al. | 348/211.99 |
| 6,538,663 B2 * | 3/2003 | Kamei | 345/635 |
| 6,567,121 B1 * | 5/2003 | Kuno | 348/211.3 |
| 6,680,746 B2 | 1/2004 | Kawai et al. | 348/211.9 |
| 6,698,021 B1 * | 2/2004 | Amini et al. | 725/105 |
| 6,720,987 B2 | 4/2004 | Koyanagi | |
| 6,856,346 B1 * | 2/2005 | Kobayashi et al. | 348/211.99 |

* cited by examiner

| LEVEL | DEFAULT DISPLAY NAME | CONTROL TIME (-1 = INFINITE) | USURP | SET PRESET | BOOT LOWER LEVELS | MULTIPLE LOGINS | VISIBLE TO LOWER LEVELS | ADVANCED FUNCTIONS |
|---|---|---|---|---|---|---|---|---|
| 0 | GUESTS | 30 | ☐ | ☐ | ☐ | ☑ | ☐ | ☐ |
| 1 | MEMBERS | 120 | ☐ | ☐ | ☐ | ☑ | ☑ | ☑ |
| 2 | STAR MEMBERS | 150 | ☐ | ☐ | ☐ | ☑ | ☑ | ☑ |
| 3 | SUPER MEMBERS | 200 | ☐ | ☑ | ☐ | ☐ | ☑ | ☑ |
| 4 | GOLD LEVEL | 420 | ☑ | ☐ | ☐ | ☑ | ☐ | ☑ |
| 5 | ENGINEERS | -1 | ☑ | ☐ | ☑ | ☐ | ☐ | ☑ |
| 6 | ADMINISTRATORS | -1 | ☑ | ☑ | ☑ | ☐ | ☐ | ☑ |
| 7 | MANAGERS | -1 | ☑ | ☐ | ☑ | ☐ | ☑ | ☐ |
| 8 | LOCAL AUTHORITY | 120 | ☑ | ☑ | ☑ | ☑ | ☑ | ☐ |
| 9 | REGIONAL AUTHORITY | -1 | ☑ | ☑ | ☑ | ☐ | ☐ | ☐ |
| 10 | SUPER USER | -1 | ☑ | ☑ | ☑ | ☑ | ☐ | ☐ |

DEFAULT ANONYMOUS LOGIN LEVEL: 0     UNRECOGNIZED USER LOGIN LEVEL: 0

FIG. 6

SYSTEMS AND METHODS FOR CONTROLLING DEVICES OVER A NETWORK

CLAIM OF PRIORITY

This application claims priority to U.S. Ser. No. 60/332,561, entitled "REMOTE VIDEO NETWORK SURVEILLANCE METHOD AND SYSTEM," filed on Nov. 21, 2001, naming Peter Mottur and Ethan Z. Zimmer as inventors, the contents of which are herein incorporated by reference in their entirety, and this application claims priority to U.S. Ser. No. 60/355,178, entitled "HIERARCHICAL SENSOR/CAMERA CONTROL," filed on Feb. 8, 2002, naming Peter Mottur and Richards Gilbert as inventors, the contents of which are herein incorporated by reference in their entirety, and this application is a continuation-in-part of U.S. Ser. No. 09/912,869, entitled "METHODS AND SYSTEMS FOR NETWORKED CAMERA CONTROL," filed on Jul. 25, 2001, naming Peter Mottur and Ethan Z. Zimmer as inventors, the contents of which are herein incorporated by reference in their entirety, where such Ser. No. 09/912,869 application also claims priority to Ser. No. 60/221,674, filed on Jul. 26, 2000.

BACKGROUND (1) Field

The disclosed methods and systems relate generally to delivering content over a computer network, and more particularly to providing content related to live action feeds controlled over the network by network users.

(2) Description of Relevant Art

The internet provides a platform for allowing the distribution of information and data such as multimedia data. Accordingly, one internet application includes broadcasting multimedia entertainment and other live action programming. Several internet websites exist that allow users to obtain live action programming that can be streamed throughout the internet to internet users. These websites can be integrated with one or more cameras, otherwise known as "webcams," that can be located at locations to capture a particular field of view. Internet users having an internet browser with the necessary plug-ins or software applications, can receive the broadcast image data from the fixed camera locations. For example, websites can include points of views for major landmarks or other central locations in various cities to allow internet users to view the weather or scenery in the camera field of view. Other websites can utilize the fixed field of view to capture, for example, commonly congested traffic areas. Unfortunately, in the latter example, there could be a traffic problem at another area on a given day, that is not within the field of view. The information or data provided from the fixed field of view therefore may not provide sufficient information to a user on a given day. In other applications, a camera can be used to view or monitor a moving subject. If the subject moves outside the camera field of view, the monitoring user may not be able to perform the monitoring function. Some systems provide limited control of camera motion, but such control can be particular to a specific individual, user, and/or network location or device, and such control can also be extremely limited to discrete camera movements. Furthermore, many multimedia broadcasts include significant delays between image updates, resulting in choppy broadcasts that can appear to be, or may be, a string of static images that are presented with a discernible delay between successive images.

SUMMARY

The disclosed methods and systems provide control of at least one camera to at least one network user. The camera(s) and network users can be in communication with each other through a network including the internet or a public or private network. The network users can utilize a microprocessor-controlled device that includes or displays an interface, including a graphical user interface (GUI), database or scripting interface, menu driven interface, etc., that can be collectively referred to herein as an interface. The interface can provide data from which camera control commands (e.g., instructions or data) can be generated and transferred to the camera. Additionally, the camera can provide video (and audio) data for display or presentation to the network user. The audio/video data can be provided in real-time using uncompressed analog or digital streaming modes/formats to provide continuous feedback to the network user.

The connection between the network user and the camera(s) can facilitate communications via fiber optic, infrared, satellite, Radio Frequency (RF), microwave, cable, or Internet Protocol (IP), or other communications modes and/or protocols.

The interface can be provided by an applet or an application. In one embodiment, the interface can have a control area that can have a cursor within the control area. Movement of the cursor within the control area can be translated to camera controls. For one embodiment, the control area can be calibrated such that continuous commands (e.g., instructions or data) can be provided to the camera based on the cursor position while the cursor is active. In one embodiment, while the cursor is active, pan and tilt commands (e.g., instructions or data), or instructions/data based thereon, can be provided to the robotic pan/tilt head to which the camera is mounted, connected, or otherwise in communications. When the cursor is inactive, camera commands (e.g., instructions or data) may not be provided to the camera. The interface can also have options for adjusting focus and zoom.

In some embodiments, control commands can be mapped or otherwise associated with keyboard features including keys, and/or other peripheral devices including joysticks, control panels, and touchscreens, using, for example serial cables (RS-232, 422, 485), Universal Serial Bus (USB), FireWire, other communications protocols and/or devices.

The disclosed methods and systems also include at least one queue for administering control between the network users and the cameras. Network users can request control of a camera, and depending upon whether the network user is a subscriber or non-subscriber, the network user can be provided or otherwise associated with a camera control time interval, and placed in the queue. Camera control can be determined from the queue position, with a single user having control of a camera at a given time, and for a given time interval that can be equal to the camera control time interval associated with the user.

In some embodiments, a system administrator can establish the control intervals for subscribers and non-subscribers. A system administrator can also provide conditions or rules by which queue position can be determined. Furthermore, a system administrator can usurp control of the camera, remove a user from the queue, and deny a request from a user by preventing a user from obtaining position in a queue.

Also disclosed is a system having at least one controlled region, at least one camera associated with the controlled region(s), and a processor-controlled user device, the user device having an interface by which a user can select one of the at least one camera, and provide variable speed control commands (e.g., instructions or data) over a network to the selected camera. The system can further include one or more sensors associated with the controlled region(s), where the sensor(s) can include a processor and processor instructions, and can include facial recognition systems, image processing systems, motion sensor(s), thermal sensor(s), seismic sensor(s), acoustic sensor(s), chemical sensor(s), gas sensor (s), biological sensor(s), biometric sensor(s), radioactivity sensor(s), flow sensor(s), and/or other sensors. The sensor(s) can communicate with the camera(s) and/or a playback system. The camera(s) can be positioned based on a signal from the sensor(s). The camera(s) can also be associated with instructions to position the camera based on a signal from a sensor(s).

The systems also include one or more playback systems that can be associated with the controlled region(s) The playback systems can include one or more video recorder(s), one or more audio recorder(s), one or more playback video means, one or more playback audio means, and one or more analysis module(s).

In the disclosed systems, the interface provided to the user can have options and/or privileges based on the user device, the user, the controlled region(s), and/or the camera(s). The interface can thus include configurable options based on information associated with the user, the controlled region (s), and the camera(s). Accordingly, in an embodiment, the disclosed methods and systems include one or more databases to associate a user identification information and/or privileges. The identification information can include a user name, a password, and/or biometric data, and the privileges can be based on the controlled region(s) and the camera(s).

The disclosed methods and systems can include a database to associate the camera(s) with a protocol(s), and the methods and systems can also include instructions for causing pan and tilt data or data based thereon, and in some embodiments, zoom and focus data, to be provided from the user device to the at least one camera based on the at least one protocol.

In an embodiment, the camera(s) can include, or otherwise be accompanied by one or more non-camera devices associated with the controlled region(s), where the non-camera device(s) can be at least partially controlled by the interface. The non-camera devices can include devices mounted on a pan/tilt head, which can be a robotic pan/tilt head. In an embodiment, the methods and systems include one or more databases to associate the non-camera device(s) with a protocol(s), and also included in the methods and systems are instructions for causing data from the user device to be provided to the at least one non-camera device based on the at least one protocol.

In an embodiment, the interface can include a display, and in some embodiments, the interface can include a graphical user interface, a database interface, a scripting interface, a menu driven interface, and/or a text-based interface. The interface can include a control area, where at least one of pan and tilt commands, or data based thereon, are provided to the camera(s) and/or non-camera device(s) based on a relative position of a cursor in the control area. The relative position of the cursor can be based on an initial cursor position, such as an origin of the control area. Accordingly, the variable speed control commands can be based on an origin, and a user-designated distance from the origin. The origin can be a designated location, and/or an initial contact location selected by the user.

Accordingly, also disclosed is a system and method including one or more controlled regions, one or more sensors associated with the controlled region(s), one or more controlled region devices associated with the controlled region(s), the controlled region device(s) being controlled at least in part by at least one of pan and tilt commands, one or more alarms associated with the sensor(s), and, a processor-controlled user device for receiving an alarm notification based on the alarm(s), the user device having an interface by which a user can select a controlled region device, and provide variable pan and/or tilt commands, and in some embodiments, variable focus and zoom commands, over a network to the selected controlled region device. The sensor (s) can include one or more of the following: a facial recognition system, instructions to perform image processing, motion sensor, thermal sensor, seismic sensor, acoustic sensor, chemical sensor, gas sensor, biological sensor, biometric sensor, radioactivity sensor, and flow sensor. The sensor(s), and the controlled region device(s), can thus include a microprocessor-controlled device, otherwise referred to herein as a processor-controlled device.

The interface can be based on user privileges associated with the user, and/or the controlled region associated with the selected controlled region device, the user device, and/or the selected controlled region device. The interface can include an origin, and the pan and/or tilt commands can be based on a user-designated distance from the origin. The origin can be a designated location, and an initial contact location selected by the user. The interface can include options to usurp control, boot control, direct data from the selected controlled region device, restrict data from the selected controlled region device, and redirect data from the selected controlled region device.

The controlled region device(s) can include a camera, a gun turret, a missile turret (e.g., a missile launcher), a spotlight, and an antenna.

Also disclosed is a method that includes providing at least one controlled region, the at least one controlled region associated with at least one controlled region device, providing an interface(s) to allow one or more users to (i) select one of the at least one controlled region devices, and (ii) generate at least one of pan and tilt commands, where the interface(s) is provided on a processor-controlled user device, the interface(s) having an origin, where the pan and tilt commands are based on a user-selected distance from the origin, and where the method includes converting the generated pan and tilt commands to control the selected controlled region device. The method also includes associating one or more sensors with the controlled region(s).

The disclosed methods can include providing one or more alarms and/or alarm notifications to the user(s), where the alarm(s) and/or alarm notification(s) can be based on the sensor(s) and/or data from the sensor(s). Accordingly, the disclosed methods can include associating sensor(s) with the controlled region(s), and, based on data from the sensor(s), providing an alarm(s) and/or an alarm notification(s) to the user(s), the alarm(s) and alarm notification(s) to identify or otherwise inform the user regarding: the controlled region associated with the sensor(s) on which the alarm(s) and/or alarm notification(s) are based, and the device(s) associated with the controlled region(s) associated with the sensor(s) on which the alarm(s) and alarm notification(s) are based.

The interface can include one or more controls to perform one or more of the following: usurp control of the selected controlled region device, boot a user from control of the selected controlled region device, redirect data from the selected controlled region device, direct data from the selected controlled region device, and restrict data from the selected controlled region device. The interface can be based on one or more of the following: the controlled region associated with the selected controlled region device, the user device, user privileges, and the selected controlled region device. The controlled region device(s) can include one or more of the following: a camera, a gun turret, a missile turret (e.g., launcher), a spotlight, and an antenna.

The sensor(s) can include one or more of the following: facial recognition systems, image processing systems, motion sensor(s), thermal sensor(s), seismic sensor(s), acoustic sensor(s), chemical sensor(s), gas sensor(s), biological sensor(s), biometric sensor(s), radioactivity sensor(s), flow sensor(s), and/or other sensors.

Also disclosed is a method for controlling access of at least one user to at least one camera, the access provided over a network, the method including providing at least two user levels, associating a user privilege(s) with the at least two user levels, receiving a request from at least one of the at least one user for access to one of the at least one camera, associating the requesting user(s) with at least one of a user level(s) and at least one privilege associated with the user level, and, based on the associated user level(s) and/or associated privileges, processing the user's request. Associating user privileges includes associating a control time, a usurping privilege, a camera preset privilege, a boot lower level user privilege, a multiple login privilege, a hidden login privilege, an advanced camera function privilege, a direct audio/video privilege, a redirect audio/video privilege, and/or a restrict audio/video privilege. Receiving a request includes receiving identification information from the user, where the identification information can include a user name, a password, biometric data, an email address, and a cookie. The receipt of the identification information can be a basis for identifying the user as a guest, and associating a guest with a user level and/or privileges based on a guest user level. Further, the requesting user can be identified as a registered user. Associating the request of the requesting user can include querying at least one database associated with the at least one camera. The database(s) can be associated with the camera(s) for which control is requested.

In one embodiment, based on a query of a database, the requesting user can be prompted to provide user identification information. Further, the user can be identified as an unrecognized user, where such user may not be identified, but may be associated with a user level and/or privileges assigned to unrecognized users.

The received request can thus be associated with control of the camera, and based on the request, the user's request can be placed in a queue. The queue can be managed as a first-in, first-out queue, for example, although other arrangements can be used. In an embodiment, the user's request can be placed in a queue associated with the camera(s), and the user level associated with the user.

Accordingly, the methods and systems can include providing at least one database to associate the user with identification information, a user level(s), and/or a user privilege(s). In an embodiment, the user levels can be associated with a camera(s). Associating user privileges with the user levels can include identifying at least one camera(s) for which access and/or control is requested, and, associating user privileges based on the identified camera(s).

Processing the user's request can include providing an interface to the user based on the user level, the privileges associated with the user level, and/or the camera for which control/access is requested. The interface can include a control area for providing at least one of pan and tilt commands to the camera, where the commands vary based on a position of a cursor. The cursor is can be visible and/or non-visible. The pan and tilt commands can be based on an origin and a user-designated distance from the origin. The origin can be a designated location, and/or an initial contact location selected by the user.

Also disclosed is a method for controlling access of at least one user to at least one device, the access provided via a network, the method including receiving a request from at least one of the user(s) to control one of the device(s), associating at least one user privilege with the at least one requesting user, and, based on the user privilege(s), providing the requesting user(s) with an interface to generate pan and tilt data, where the requested device is controlled at least in part based on the pan and tilt data. Receiving a request can include receiving identification information, a user name, a password, an email address, and/or a cookie.

Associating privileges can include associating based on the requested device and/or a controlled region associated with the requested device. Privileges can include one or more of a control time, a usurping privilege, a camera preset privilege, a boot lower level user privilege, a multiple login privilege, a hidden login privilege, an advanced camera function privilege, a direct audio/video privilege, a redirect audio/video privilege, and a restrict audio/video privilege.

The methods and system can include providing at least two levels of users, where privileges can be associated with the levels to provide a hierarchy of user levels. The requesting user(s) can thus be associated with one or more user levels. Further, based on the user level(s) associated with requesting user(s), the requesting user(s) can be associated with at least one queue. Accordingly, providing control to the requesting user(s) can be based on a user level(s) associated with the requesting user(s), and privileges associated with the requesting user(s).

The methods include providing an interface based on a user device(s) associated with the requesting user(s) and/or the requested device. The interface can include an origin, and the pan and tilt data can be based on a user-designated distance from the origin. The origin can include a designated location and/or an initial contact location selected by the user. The interface can include an interface include an option to perform privileges such as to usurp control, boot control, direct data from the requested device, restrict data from the requested device, and/or redirect data from the requested device. The requested device can include a camera(s), a spotlight(s), an antenna(s), a gun turret(s), and a missile turret(s).

The methods and system can thus include receiving pan and tilt data from the requesting user based on the interface, and converting the pan and tilt data based on the requested device(s). For example, converting based on a protocol associated with the requested device(s).

Also disclosed is a system that includes one or more device(s) accessible by a network, the device(s) controlled at least in part based on pan and tilt commands, the system including at least one queue associated with the device(s), the queue(s) including requests for access to the device(s), an interface to associate the queue(s) with at least two user levels, the at least two user levels associated with one or more user privileges, at least one server for receiving the requests from one or more user(s), the requests to access the device(s), where the server includes instructions for associating the at least one requesting user with one or more of the queue(s). The interface can include a hierarchical scheme to associate the user levels with the user privilege(s). The hierarchical scheme can includesan association with one or more of the devices.

The queue(s) can include queues associated with the at least two user levels, while control of the device(s) can be based on processing requests from a selected queue, and thereafter processing requests from others of the at least one queue. Accordingly, in such an embodiment, the hierarchical scheme can include associating a priority to the user levels, and thus a queue associated with given priority may be processed completely, or in part, before queues of comparatively lower priority. In an embodiment, queues associated with priority may be afforded similar priority in obtaining access to the device(s), and thus control of the device(s) can be based on sequentially selecting requests from queue(s) having user requests. Sequentially selecting can be understood to include selecting in an order, while treating queues with requests equally. In an embodiment, a combination of weighted (e.g., prioritized) and non-weighted queuing techniques can be used to process queues. For example, in an embodiment using sequential selection, weights can be equal for at least some of the queues, while in an embodiment, some queues may be given comparatively greater weights than other queues. Accordingly, control to the device can be based on weights (e.g., priority) associated with the queues.

The device(s) can include, for example, a camera(s), a spotlight(s), an antenna(s), a gun turret(s), and a missile turret(s). Other devices capable of being controlled at least in part by pan and tilt commands can also be used.

Other objects and advantages will become apparent hereinafter in view of the specification and drawings.

BRIEF DESCRIPTION OF THE DRAWINGS

FIG. 6 provides one interface for hierarchical control of users;

DESCRIPTION

Figure 1:
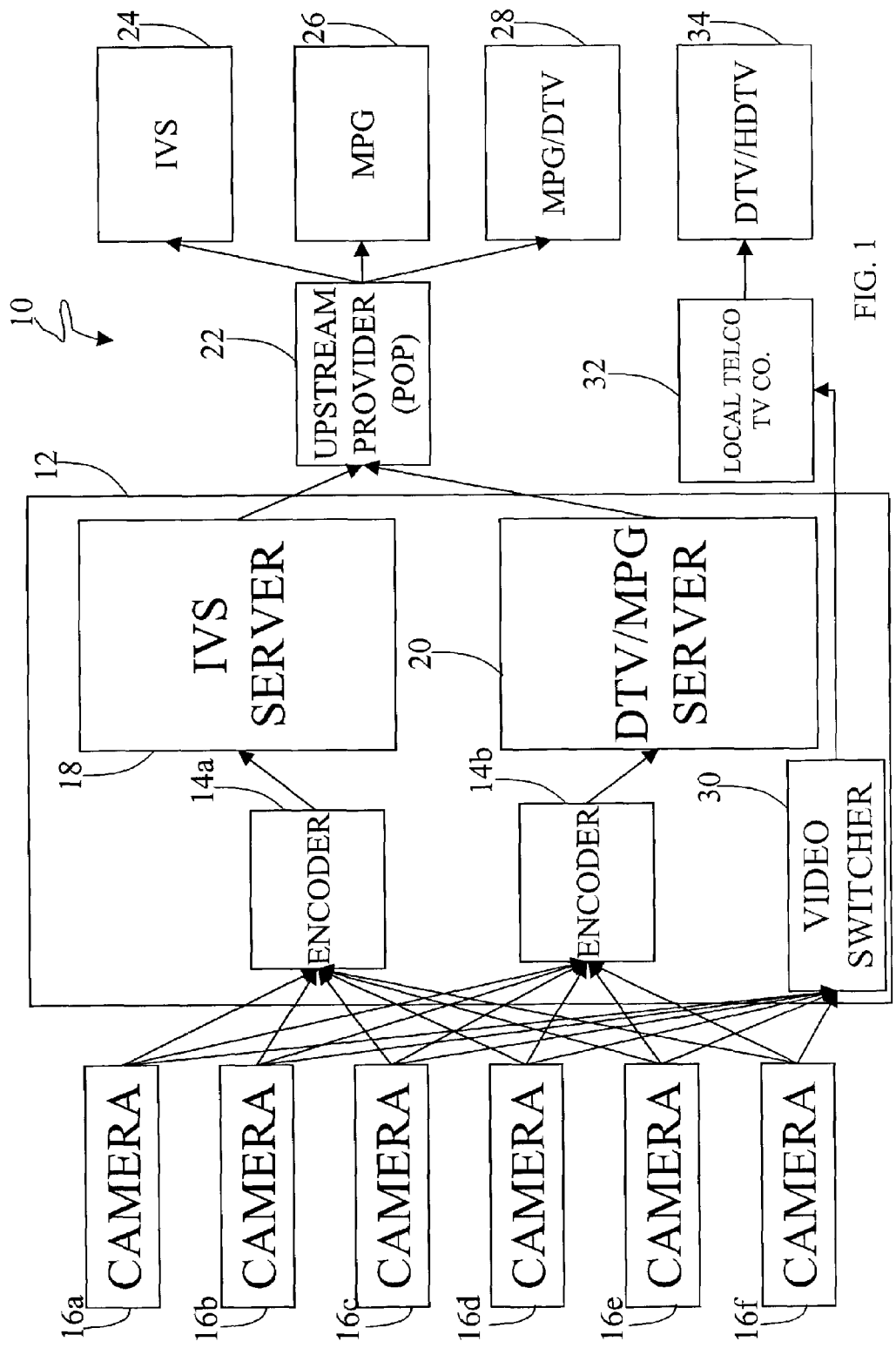
FIG. 1 is a block diagram presenting features of the methods and systems disclosed herein.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

For the purposes of the disclosed methods and systems, references to a camera can include references to a camera system that can include a robotically controlled camera and a robotic pan/tilt head to which the camera can be connected, and a processor that can control camera features including white/black balance, iris, gain, RGB, phase, timing, SC, and other like features that can be collectively referred to herein as camera presets. In some embodiments, the camera includes a pan/tilt head, while in other embodiments, the pan/tilt head can be separate from the camera. Accordingly, in some embodiments, references to camera as provided herein, can include references to one or more processors (e.g., processor associated with the camera and a processor associated with pan/tilt head; one processor for the camera and the pan/tilt head, etc.).

The disclosed methods and systems include methods and systems for providing real-time continuous streaming video and audio data from at least one remote camera system and/or location, to network users on a network such as the internet, an intranet, and/or another public and/or private network. The methods and systems include providing an interface that allows variable speed control of one or more cameras, where the interface can allow the network users to interactively control the cameras using continuous control methods and systems, wherein continuous camera control can be understood herein to include control commands provided at fixed intervals. The network users can control camera pan, tilt, zoom, focus, and camera presets using, in one embodiment, a user interface in the form of a control or touch pad. In some embodiments, focus and zoom controls can be provided using "rocker" type buttons on the user interface that have up/down or +/− controls. In another embodiment, for example, slider controls can be used for variable speed control, and such examples are provided for illustration and not limitation. The pan, zoom, focus, and tilt controls, which provide data and/or other instructions, can be fluid controls to allow control commands to be provided to the camera(s) in a continuous manner as provided herein, for fluid camera movement. The methods and systems can thus be utilized to provide surveillance and/or security to an area where such area can be associated with or otherwise be designated as a controlled region. The controlled region can be associated with one or more of the aforementioned cameras and one or more sensors, one or more of which can be associated with alarms, such that the alarm(s) can provide for remote control, for example, of the camera(s) to locations associated with the alarms. The disclosed methods and systems also include a hierarchical camera control and means for providing usurping and other privileges to one or more categories of camera controllers.

The methods and systems herein are not limited to the communication channel by which the camera control and/or video/audio streaming data can be communicated. Although examples of communications channels can include fiber optic, infrared, satellite, Radio Frequency (RF), microwave, cable, Internet Protocol (IP), etc., such examples are provided for illustration and not limitation.

Referring now to FIG. 1, there is an architectural block diagram 10 providing features for the methods and systems disclosed herein. FIG. 1 presents a system that includes a regional distribution center 12 that can otherwise be understood as a Network Operating Center (NOC). The center 12 can include one or more encoders 14a, 14b, that can accept uncompressed audio-video input from one or more cameras 16a-16f. The encoder outputs can be input to an Internet Video Streaming (IVS) web server 18 and a Direct Television (SDI/DTV) or MPEG (MPG) video server 20. The servers 18, 20 can communicate with a point-of-presence (POP) server 22 to distribute audio-visual data from the cameras 16a-16f using IVS 24, MPEG (MPG) 26, or MPG/DTV 28 audio-video formats. The audio-video formats can additionally be compatible with Real Networks, Windows Media Player, Quicktime, MPEG-2, etc., where such examples are provided for illustration and not limitation. The audio-visual data from the cameras 16a-16f can additionally and optionally be presented to a video switcher 30 and thereafter to a telephone communications provider or television company 32 that can distribute compressed or uncompressed audio-video data for broadcast in a format that can include analog or digital television (SDI/DTV), including high-definition digital television (HDTV) 34.

The FIG. 1 cameras 16a-16f can include, for example, robotically controlled cameras that can be commercially available from manufacturers including Panasonic, Sony, Canon, Pelco, Hitachi, Fujinon, Phillips, JVC, and Sensormatic, with such examples provided merely for illustration and not limitation. As indicated previously, the cameras 16a-16f can communicate uncompressed audio and video data to the center 12 using fiber optic cable, for example. The encoders 14a, 14b can encode the uncompressed video data for presentation to the servers 18, 20 that can thereafter distribute the data over a network or other communications link. Although the illustrated encoders 14a, 14b receive inputs from multiple cameras 16a-16f, other embodiments can include a one-to-one relationship between video encoders 14a, 14b and cameras 16a-16f.

The illustrated web server 18 can be equipped with software, hardware, or a combination thereof, that can convert the data for compatibility with MPEG 1/2/4/7, JPEG, M-JPEG, RTP, RTSP, or Java Media Framework (JMF), or other formats that can be compatible with, for example, a Quick Time server, a Real Player server, a Windows Media server, or another server that can deliver audio-video data over a network.

The illustrated video server 20 can also compress the uncompressed audio-video data from the encoders 14a, 14b, to allow a format suitable for delivery over a network. As FIG. 1 illustrates, the POP server 22 can receive data from either the web server 18, the video server 20, or both.

The illustrated servers 18, 20, 22 can be one or more microprocessor-based systems including a computer workstation, such as a PC workstation or a SUN workstation, handheld, palmtop, laptop, personal digital assistant (PDA), cellular phone, etc., that includes a program for organizing and controlling the server 18, 20, 22 to operate as described herein. Additionally and optionally, the server 18, 20, 22 can be equipped with a sound and video card or device for processing multimedia data. The server 18, 20, 22 can operate as a stand-alone system or as part of a networked computer system. Alternatively, the server 18, 20, 22 can be a dedicated device, such as an embedded system, that can be incorporated into existing hardware devices, such as telephone systems, PBX systems, sound cards, etc. In some embodiments, servers 18, 20, 22 can be clustered together to handle more traffic, and can include separate servers for different purposes such as a database server, an application server, and a Web presentation server. The server 18, 20, 22 can also include one or more mass storage devices such as a disk farm or a redundant array of independent disks ("RAID") system for additional storage and data integrity. Read-only devices, such as compact disk drives and digital versatile disk drives, can also be connected to the server 18, 20, 22. Additionally and optionally, the client-server model is well known as a relationship between a requester program, otherwise known as the client, and the program that services the request, otherwise known as a server 18, 20, 22. It is also well-known that the client and server 18, 20, 22 can reside on the same device, and such understanding can be applied to the disclosed methods and systems and to FIG. 1, where the servers 18, 20, 22 can also be viewed as clients in the client-server model. As used herein, the term "server" is intended to refer to any of the above-described servers.

For a system according to FIG. 1, data from the cameras 16a-16f can be multiplexed and provide for lower bandwidth video that can be viewed on conventional internet devices that can utilize web browsers and/or at least one software application. The multiplexed video data can be provided on-demand from the video server 20 to data network users that, in one embodiment, utilize Internet Protocol (IP). As indicated herein, the video data can be distributed over private networks or public networks such as the internet.

In some embodiments, the audio-video data from the cameras 16a-16f can be communicated using an intra-lata (local access transport area) service that can otherwise be known as local toll, regional, or zone service. The intra-lata service can also be used for distributing the audio-video data from the center 12 to the network.

Figure 2:
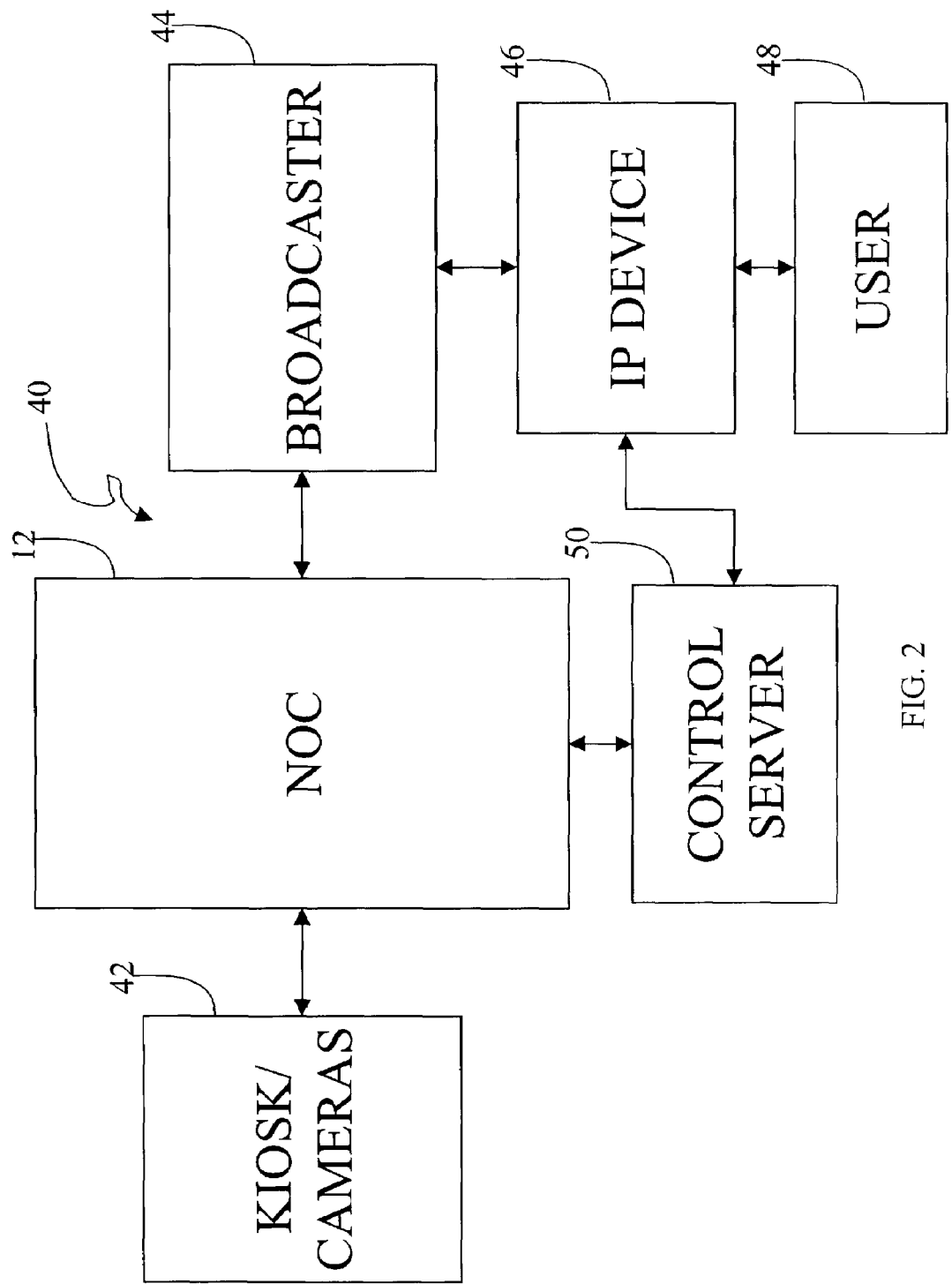
FIG. 2 is a diagram of one embodiment for television broadcasting.

Referring now to FIG. 2, there is a system 40 for coupling or integrating a kiosk 42 to the center or NOC 12 and thereafter to a broadcaster 44 to exchange data between the kiosk and the broadcaster 44. In the FIG. 2 system, an IP device 46 can couple at least one internet user 48 to the broadcaster 44 to receive audio-video data from the kiosk 42. The broadcaster 44 can optionally and additionally transfer the data through a television broadcast.

The FIG. 2 kiosk 42 can include a robotic camera as described previously herein. Furthermore, the kiosk 42 can be equipped with a video prompter, audio devices (microphones, mixers, compressors, speakers, etc.), and a microprocessor-controlled device that allows remote control of the camera, lighting, LCD ticker, microphones, and other systems integrated with the kiosk. Accordingly, the internet users 48 can interact (i.e., via IP control) with the broadcast from the kiosk 42 by controlling the camera via a control server 50. The control server 50 can allow control by providing a graphical user interface, for example, to the users 48 to allow the users 48 to control the kiosk camera(s) and hence interact with the television broadcast. The graphical user interface can be provided, for example, using a Java applet or an application.

Figure 3:
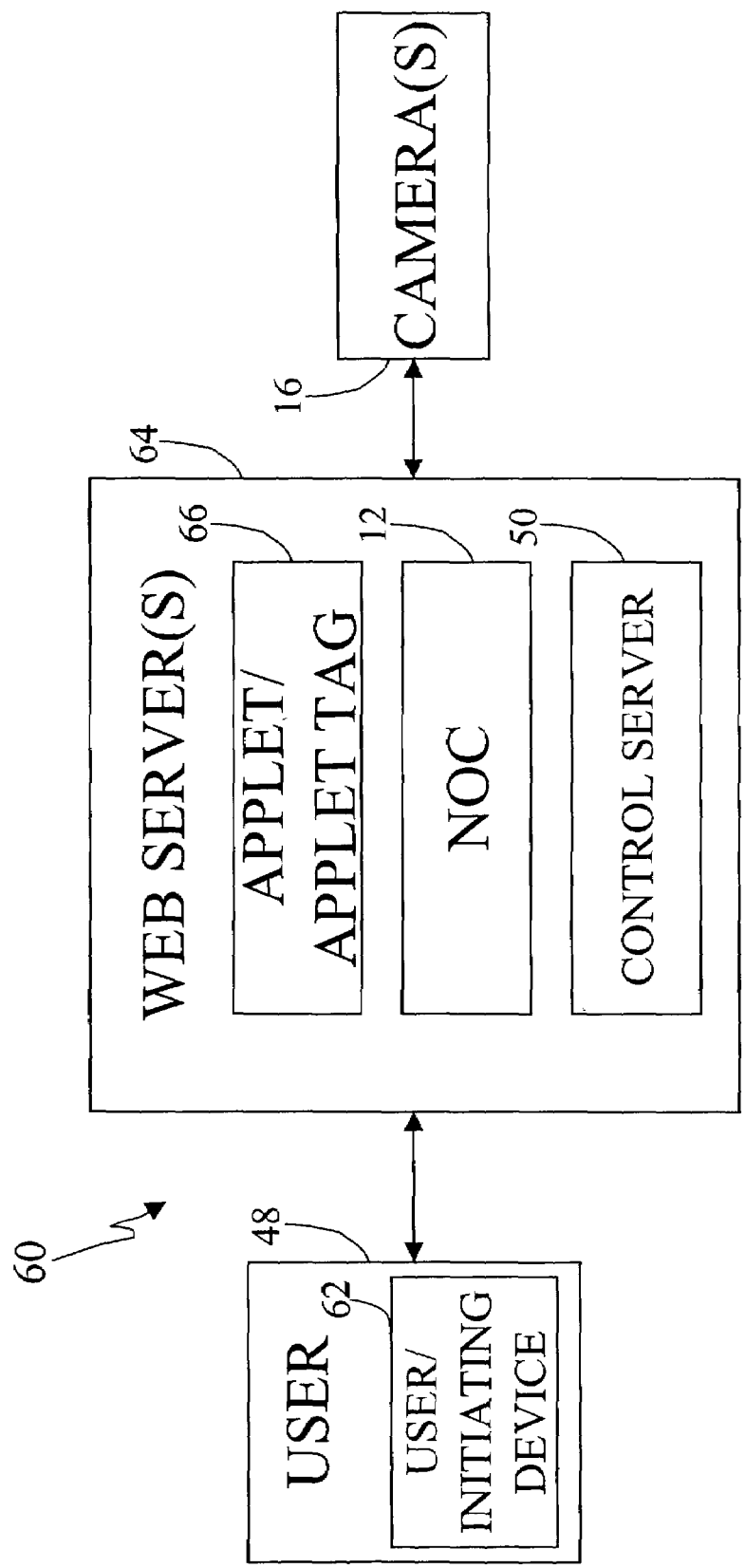
FIG. 3 displays an alternate embodiment for the methods and systems.

Referring now to FIG. 3, there is a block diagram 60 for representing systems and methods that can be integrated with the systems and methods of FIGS. 1 and 2. Those with ordinary skill in the art will recognize that FIGS. 1, 2, and 3, and other Figures provided herein, can provide similar features of varying detail. Accordingly, as illustrated in FIGS. 2 and 3, the user 48 can be understood to include a user-device or initiating device 62 that can include a processor-controlled device such as a digital computer system that can utilize a wired or wireless communications link to connect to a communication network such as the internet. The user(s) 48 of the user device 62 can utilize different peripheral devices that can be integrated with or otherwise configured for compatible use with the user device 62. For example, the user device 62 can include a keyboard, keypad, stylus, joystick, digital camera, microphone, etc., that can communicate data to the user device 62 using wired or wireless communications systems and/or protocols, etc. The user device 62 can be a processor-controlled and/or microprocessor-based system including a computer workstation, such as a PC workstation or a SUN workstation, handheld, palmtop, laptop, personal digital assistant (PDA), cellular phone, etc., that includes a program for organizing and controlling the user device 62 to operate as described herein. Additionally and optionally, the user device 62 can be equipped with a sound and video card for processing multimedia data. The user device 62 can operate as a stand-alone system or as part of a networked computer system. Alternatively, the user device 62 can be a dedicated device, such as an embedded system, that can be incorporated into existing hardware devices, such as telephone systems, PBX systems, sound cards, etc. Accordingly, it will be understood by one of ordinary skill in the art that the user device 62 described herein has wide applicability and can be incorporated in many systems, and realized in many forms.

For a system according to FIG. 3, the user device 62 can be connected to a network such as the internet and can be equipped with what is well-known as an internet "browser" such as the commercially available Netscape Navigator, Internet Explorer, etc., browsers, and those with ordinary skill in the art will recognize that, depending upon the user device 62 and its configuration, the browser can differ, and hence references herein to a browser can include references to a user interface to the internet or other network, wherein the methods and systems herein are not limited to the browser or other network interface. Furthermore, the user device 62 can access the internet using wired or wireless communications links and/or protocols.

Referring again to FIG. 3, the user 48, via the user device 62, can request information via a network from one or more web servers 64, for example. The illustrated web server 64 can include features that have previously been described in relation to the NOC 12 and the control server 50. Additionally and optionally, the web server 64 can include one or more applets and/or applet tags 66 that can cause an applet on the web server 64 or another server (or web server) to be communicated or otherwise available to the user device 62. For the methods and systems disclosed herein, an applet or applet tag 66 can provide at least one interface that, in the illustrated embodiments is a graphical user interface (GUI), for display on the user device 62. Those with ordinary skill in the art will recognize that the interface is not limited to an interface, and can include, for example, database or scripting interface, menu driven interface, etc., and accordingly references herein to a or the interface can be understood to be references to an interface that can operate according to the methods and systems disclosed herein. For example, in a database interface, a camera 16 can be positioned at predetermined locations at corresponding times.

In one embodiment of the FIG. 3 systems and methods, an interface can be manipulated or otherwise controlled by the user, and the control can be communicated to the camera(s) 16. Furthermore, another applet 66, or additionally and optionally, an application residing on the user device 62, can cause the user device 62 to display or otherwise present audio/visual data to the user 48 in a real-time continuous streaming mode. The user 48 can, through the interface, control the camera 16 with real-time continuous audio/visual feedback.

As indicated previously herein, in some embodiments, the web server 64 can be a separate device or program from the control server 50, the NOC 12, and other features of the web server 64. For example, in an embodiment, the control server 50 and NOC 12 can be separate servers and can have separate processors that can be in communication with the web server 64. Additionally and optionally, the NOC features 12 and the control server 50 can be integrated with the user device 62 or one or more processors related to or otherwise associated with the camera 16. Those with ordinary skill in the art will thus recognize that there are various configurations of the FIG. 3 system that can be employed without departing from the methods and systems provided herein.

Figure 4:
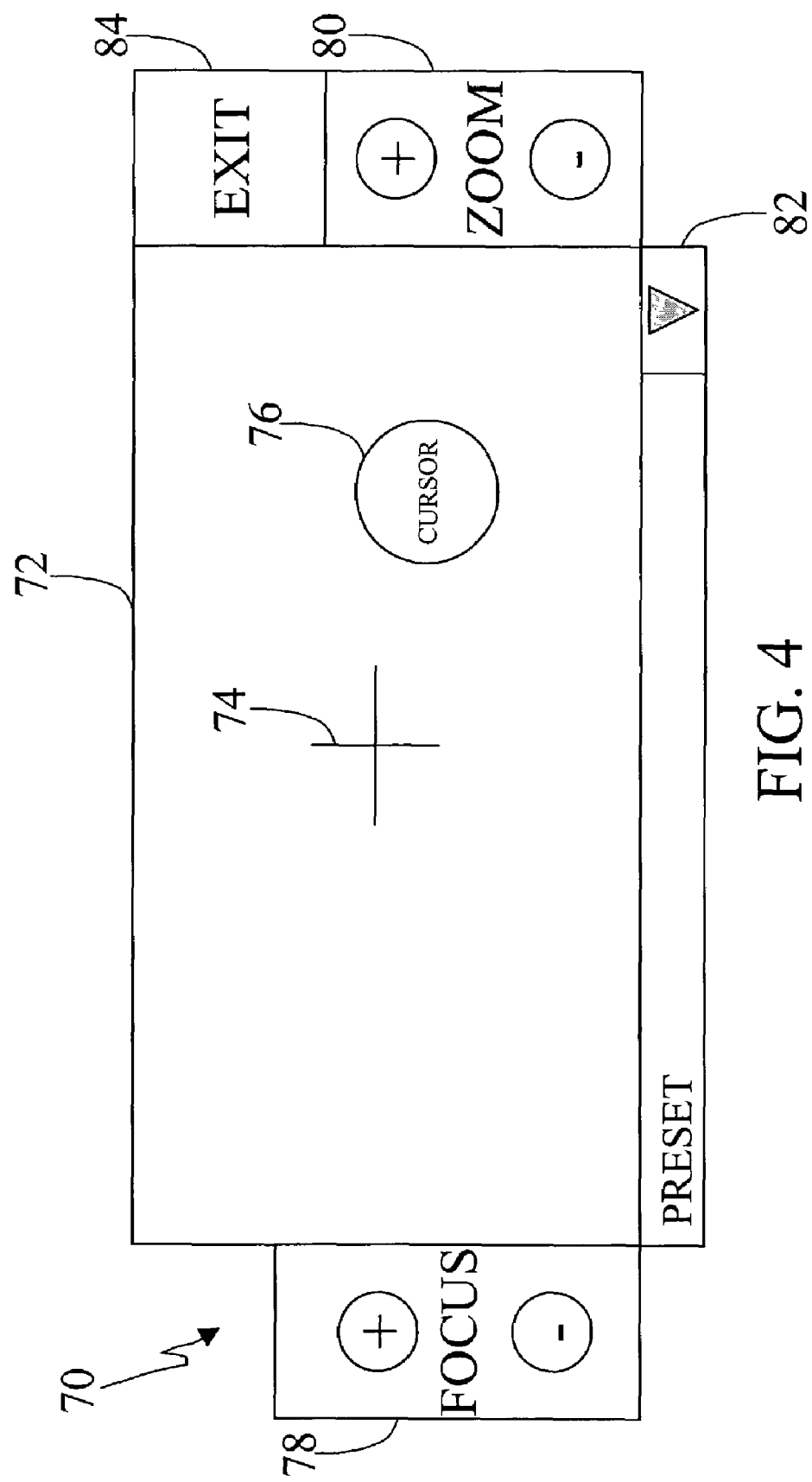
FIG. 4 presents one user interface for control of a camera (s)

Referring now to FIG. 4, there is an illustration of one interface that is a graphical user interface (GUI) 70 that can be provided to the user device/user 62, 48 for controlling the camera 16 according to a system of FIG. 3. The FIG. 4 interface 70 can be presented with a window or other presentation of audio/visual data such that the user 48 can view audio/video data based on the camera 16 positioning, as the user 48 controls the camera 16.

The illustrated interface 70 includes a control pad or area 72 that includes an origin designation 74 that, in the illustrated embodiment, is a "+", although other origin designations can be used. The control pad also includes a cursor 76 that can be controlled by the user 48. For example, in one embodiment, the user 48 can control the cursor 76 by dragging the cursor with a mouse, stylus, joystick, or other peripheral device that can be integrated according to the methods and systems to control the cursor 76. In other embodiments, the cursor 76 can be directed using voice commands or by utilizing an interface that otherwise allows the cursor 76 to be positionally directed within the control area 72. In the illustrated embodiment, the illustrated cursor 76 cannot leave the control area 72.

The illustrated interface 70 can be calibrated or otherwise configured such that when the cursor 76 is placed at the origin 74, the camera position remains fixed. Accordingly, for the illustrated interface 70, the control area 72 can be understood to be continually relative to the current camera position. Consequently, as the cursor moves from the origin 74, corresponding control commands can be generated and provided to the camera 16 to allow continuous camera control and fluid camera positional movement in the pan and tilt directions. These directions can also be referred to as range and azimuth, or x and y, and the disclosed methods and systems are not limited to a choice of coordinate system or axes representation or labeling.

For purposes of discussion herein, camera 16 control can be referred to as pan and tilt, where pan can be understood to be left-right camera motion, while tilt can be understood to be camera up-down motion. With regard to the illustrated control area 72, the control area 72 can be described with reference to the cartesian coordinate system, such that left-right cursor 76 motion can be referred to herein as motion in the "x" direction, while up-down (tilt) movement can be referred to herein as cursor motion in the "y" direction. Accordingly, for the illustrated control area 72, cursor 76 movement solely in the x direction, along the x-axis origin 74, translates to panning the camera 16 with increased magnitude (speed) as the distance from the origin increases. Similarly, for the illustrated control area 72, cursor 76 movement solely in the y direction, along the y-axis origin 74, translates to tilting the camera 16, with increased magnitude (speed) as the distance from the origin increases as designated by the user. Furthermore, moving the cursor 76 in both the x and y directions translates to camera 16 control in both the pan and tilt directions.

The illustrated control area 72 can be calibrated such that the user-designated distance from the origin 74 in the x and y directions can be translated into corresponding pan and tilt camera control commands (e.g., instructions and/or data). The calibration and camera control commands can be based on the camera 16, camera 16 type, camera interface, etc. For example, in some embodiments, the control area 72 can be understood to include a grid where the cursor 76 movement can be measured based on the grid position. The grid may or may not be visible to the user 48 via the interface 70.

For the illustrated systems and methods, camera control is only provided when the cursor 76 is activated. As an example, consider that a user "activates" the cursor 76 in the control pad area 72 by selecting the cursor 76 with a computer mouse, and subsequently drags the cursor 76 to a position that can be viewed as one unit in the x-direction, and two units in the y-direction. Based on the cursor 76 position, pan and tilt commands (e.g., instructions and/or data), or the equivalent thereof, can be provided to the camera 16 (camera driver(s)) based on the x and y cursor positioning. In some embodiments that can be dependent upon the camera 16, camera commands can be provided for diagonal movement of the camera 16, or incremental pan and tilt movements can be provided to the camera 16 to achieve the desired positioning. For the illustrated systems and methods, should the user 48 maintain an active cursor 76 at a fixed, non-origin position, camera commands of the same magnitude and in a continuing process can be transmitted to the camera 16. Alternately, in the illustrated embodiments, when the user 48 "deactivates" or inactivates the cursor 76 in the control pad area 72, including releasing a computer mouse button, the illustrated cursor 76 can return to the origin 74, thereby ceasing the transmission of control commands to the camera 16. In an embodiment, deactivation of the cursor 76 can cause the transmission of a "stop" command to the camera 16. In some embodiments, deactivating the cursor 76 can cause the camera 16 to receive pan and tilt commands (e.g., instructions and/or data) that do not provide any camera 16 movement. Accordingly, one of ordinary skill in the art will recognize that cursor positioning at the origin 74 can provide an option to cease camera control command transmission, or can equivalently cause camera control commands to be transmitted that cause no camera 16 movement. Different camera control commands can be generated from the illustrated interface 70, and in particular, the cursor 76 position, depending upon camera 16 and other system requirements.

Accordingly, for the illustrated interface 70, the further the distance that the user moves the cursor 76 from the origin 74, the greater the magnitude of the camera control commands. In one embodiment, if camera control commands are provided in a continuous manner, at fixed intervals such as once every millisecond, based on the cursor 76 position, greater magnitude commands can translate into more rapid camera movement as the camera 16 can attempt to move a greater,distance in the same one millisecond command interval. As indicated herein, the maximum camera control commands for one camera 16 can be different from the maximum camera control commands for another camera 16, and hence the interface 70 can be calibrated accordingly. In some embodiments, the same interface calibration can be used for multiple cameras, with the calibrations performed as the cursor position is translated to camera commands.

As FIG. 4 also indicates, the interface 70 can include options for focusing 78 and zooming 80 the camera 16. Because the illustrated focus 78 and zoom 80 features are not included in the illustrated control area 72, utilization of such features implies that the control pad cursor 76 is deactivated or inactivated and hence positioned at the origin 74, thereby indicating a non-mobile camera 16. Although the illustrated interface 70 does not include a visible cursor for the focus 78 and zoom 80 areas, it can be understood that a cursor can be activated for those areas 78, 80 when the user 48 depresses a button in the illustrated regions 78, 80 or otherwise causes the focus 78 and/or zoom 80 features to be enabled. For one embodiment using the illustrated interface 70, depressing a computer mouse button in the focus or zoom areas 78, 80 can be understood to be cursor activation, while releasing the computer mouse button can be understood to be cursor inactivation. In some embodiments, dual control of the cursor 76 and focus 78 and/or zoom 80 features can be available, and in some embodiments, the focus 78 and/or zoom 80 features can be combined with the features of the control pad 72.

Although not illustrated in FIG. 4, an interface or GUI for the disclosed methods and systems can include controls for camera presets, previously defined herein as camera settings or features that can include white/black balance, iris, gain, RGB, phase, timing, SC, and other like features.

As indicated previously, continuous camera control can be understood herein to include control commands that can be transmitted to the camera at fixed intervals for a given time period. For example, as previously provided, camera commands can be transmitted to the camera 16 while the cursor 76 is active, and such commands can be sampled and/or transmitted at a rate of once per millisecond. As also indicated herein, control commands can vary, and can include, for example, pan, tilt, focus, zoom, camera presets, or combinations thereof. Accordingly, in one embodiment of the methods and systems herein, the given time interval during which control commands can be generated can be, for example, the time period during which the cursor 76 is active. As indicated herein, for the illustrated interface 70, the cursor can be active in the control pad area 72, or while operating the focus 78 and/or zoom 80 features.

The illustrated interface 70 also includes a location preset camera positioning option 82 such that a user can designate a fixed camera position for future retrieval. The illustrated interface 70 thus provides a drop-down box 82 that can retrieve previously defined or stored camera positions. Selections of the predefined positions can cause appropriate camera commands to be transmitted to the camera 16, to cause the camera 16 to be positioned at the desired, specified, and predefined position or location.

The FIG. 4 interface 70 also provides an option to exit 84. When a user 48 selects the illustrated exit option 84, the user 48 relinquishes control of the camera 16. In some embodiments, exit 84 selection can cause the interface 70 to be eliminated from the user's display, while in other embodiments, exit 84 selection merely causes the user to relinquish camera control.

As indicated previously herein, the methods and systems include features for allowing more than one user 48 to control a camera 16 over a network interface. The illustrated methods and systems can implement a dynamic queuing feature that can facilitate the shared control. In the illustrated systems as provided in FIGS. 3 and 4, users 48 can subscribe to or otherwise register with the web server 64 or control server 50. Such users 48 can, for example, be provided user names, accounts, passwords, and login information such that when the registered users 48 access the web server 64, the users can be recognized as a subscriber or registrant. The methods and systems disclosed herein can also make features available to a system administrator of the web server 64 or the control server 50 that can allow the server(s) 64, 50 to provide designated features, capabilities, or privileges to subscriber users 48. Alternately, a system administrator can configure the methods and systems such that non-subscriber users 48 may not be afforded or provided such privileges. Accordingly, the methods and systems can allow camera control options for subscriber users (e.g., pay-per-view access), non-subscriber users, system administrators, and others.

In one embodiment of the illustrated systems and methods, subscriber users can be provided priority regarding camera control. Accordingly, for the illustrated embodiments, a camera 16 can be controlled by only one user 48 at a single time. Requests for camera control can hence be initiated by a user 48 and received by the web server 64, for example. Based on the user's status as a subscriber or non-subscriber, the web server 64 can generate a camera control queue that provides priority to subscriber users 48. Camera control can be for a specified time interval, and camera control intervals for subscribers can be different than camera control intervals for non-subscribers. In some embodiments, camera control intervals can be based on the number of requests. In an embodiment, camera control intervals can be based on subscriber fees. Camera control interval features can be configured by a system administrator.

Those with ordinary skill in the art will recognize that there are various systems and methods for managing queues, and such methods and systems can be designated by a system administrator based on system requirements. In one embodiment, non-subscriber requests may only be processed after subscriber requests are fulfilled. Additionally and optionally, subscriber camera control time intervals can be longer than non-subscriber intervals. Once a camera control time interval expires, the user 48 can be automatically re-entered into the camera control queue. Alternately, a user 48 who terminates (e.g., "exit" 84) the camera control interval before expiration may not be re-entered into the queue.

In some embodiments, subscriber requests may only take precedence over non-subscriber requests at predefined times. In an embodiment, the system administrator can usurp control of the camera 16 from a user 48. Once the system administrator relinquishes camera control, the requests for queuing can be processed based on the queue status before the system administration usurpation. A camera control interval associated with the user 48 from which control was usurped by the system administrator, can be suspended such that when the system administrator relinquishes control, the user 48 from which camera control was usurped can be credited with control and the remaining camera control interval before the usurping.

In some embodiments, system administrators can remove a user from the queue, and/or permanently deny a user of privileges. Furthermore, a system administrator can usurp control from a user, and thereafter prevent the camera control from returning to that user. In an embodiment, system administrators do not have time limits on camera control.

In some embodiments, users 48 can be provided with a display of the current camera control user's remaining camera control time interval. Such display can be represented as a reverse stop-watch display. Users 48 can also be presented with a display of the camera control queue order, where users can be identified by login name or other specified identity data. Such data can influence a user 48 to request control of one camera 16 in contrast to requesting control of another camera 16 that may have more requests.

Figure 5A:
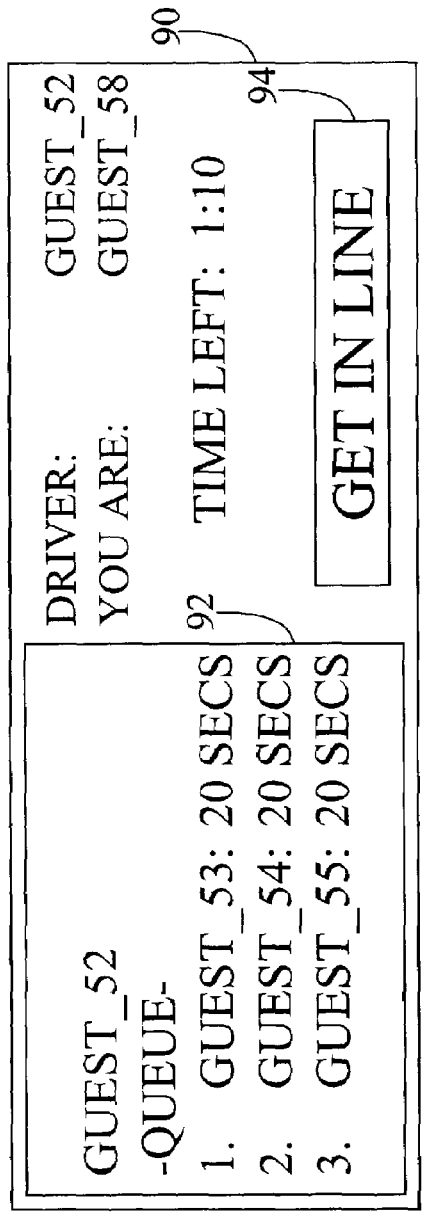
FIGS. 5A and FIG. 5B present illustrative interfaces for providing queue status and control.
Figure 5B:
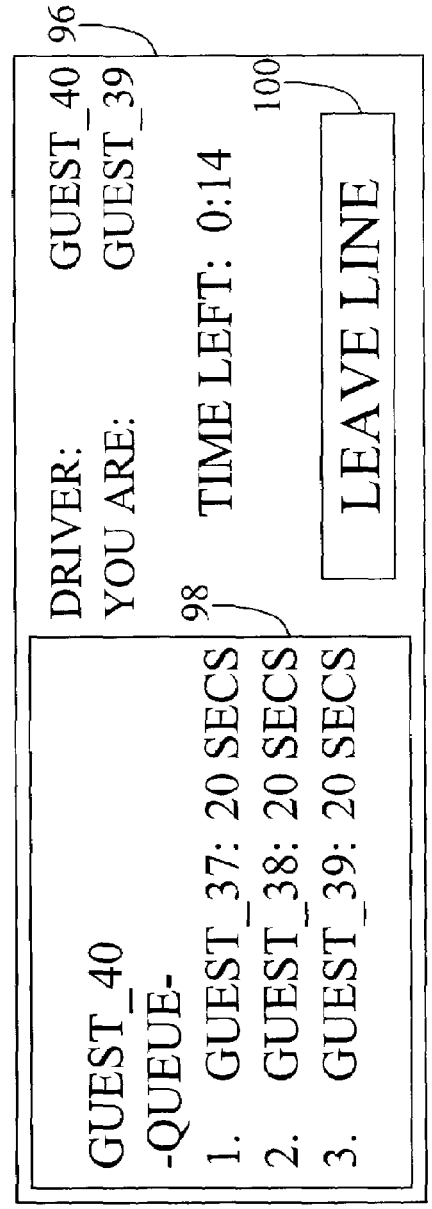

An illustration of one display method or interface for the methods and systems herein can be seen in FIGS. 5A and 5B. FIG. 5A displays an interface 90 wherein the user in control of the camera 16 is called the "driver", and is identified as Guest_52. The user being shown the display is known as Guest_58, and a queue status display 92 can indicate the current driver and the queue status that includes three parties, the associated queue order for camera control for the three parties, and the time allotted for the three parties. The display 90 also includes the status of the current driver's time interval, and an option 94 to allow the present user (i.e., Guest_58) to enter the queue.

FIG. 5B presents an interface 96 that allows a user to exit the queue. The FIG. 5B an interface 96 is similar to the FIG. 5A interface 90 and provides a queue status area 98 and a user-selectable option to exit from the queue 100.

When a user in the queue becomes the driver and is provided camera control, the driver can be provided with both visual and audio indications of such status. For example, in one embodiment, the new driver can be provided an audio signal such as a beep. Additionally and optionally, the driver's interface and/or display can be altered to indicate control mode versus queue mode.

In one embodiment, the user 48 and/or user device 62 can be provided with an applet or another program 66 that can otherwise configured the user device 62 to operate according to the disclosed methods and systems, but without a visible or distinct interface as provided by, for example, the exemplary interfaces of FIGS. 4-5B. For example, some user devices 62 may not include a display having sufficient area to provide video data and the illustrated interfaces such as those provided by FIGS. 4-5B. In such embodiments, in which at least one can employ an embodiment according to FIG. 3, the web server 64 can recognize that the user device 62 may not include sufficient display area, and thus cause such device to be configured such that the display can be configured as an interface according to FIG. 4, for example, to the extent that the display can be associated with the control pad area 72. In such an embodiment, a stylus or another instrument can be used to provide pan and tilt commands (e.g., instructions and/or data). In one such embodiment, contact of the stylus with the display can establish an origin whereby the user 48 can drag or otherwise continue contact with the display to provide the variable speed control previously described herein. In such an embodiment, the "origin" may be a location established or otherwise selected by initial contact by the user 48, and such origin can be re-established upon subsequent initial contacts with the display (e.g., an "initial" contact is a contact that is preceded by non-contact. The period of non-contact (e.g., one second, half-second, two seconds, etc.) can be specified based on the embodiment.). In an embodiment, the "origin" may be a designated location such as the center of the display/screen, and the user may be provided with a +or other indication at such origin, but in other embodiments, may not be provided with such indication. In some embodiments where the screen/display also serves as an interface, other buttons and/or controls on the user device 62 can provide other controls for zoom and focus. For example, key strokes on specified keys (e.g., arrows, letters, numbers, and other keys), mouse buttons, joystick controls, and other options can provide zoom and focus features as provided previously herein. The user-designated distance from the origin, from which pan and/or tilt commands (e.g., instructions and/or data) can be based, can be based on a user maintaining "contact" and dragging a stylus or other instrument across the display. Accordingly, it can be understood herein that references to a user interface and/or control, with reference to FIGS. 4-5B, can also be understood to include references to the interfaces described herein where the display/screen does not include a visual control pad 72 or other visual interfaces as provided in FIGS. 4-5B. Further, references herein to a "cursor" can be understood to include a visible or non-visible cursor, where a non-visible cursor can be understood to be, for example, an initial contact point as provided herein, where such non-visible "cursor" can be moved by dragging a stylus or otherwise maintaining contact while moving a stylus or other instrument.

FIG. 6 provides an interface that allows for hierarchical control amongst two or more categories and/or levels of users. As FIG. 6 indicates, guests and members, as previously provided herein, can be categories of users, while other users can be specified such as "star members," "super members," "gold level," and other users, and/or in a multi-jurisdictional application, users can be specified as "local," "state", "federal" levels and other inter-agency users providing real-time access to the system's visual communications. Although FIG. 6 indicates eleven catagories of users, those of ordinary skill will understand that the methods and systems can allow for one or more user categories that can have varying names and privileges, and thus FIG. 6 is merely one example for one interface to establish hierarchical control.

As FIG. 6 provides, user privileges and/or permissions can be associated with user categories. For example, a system administrator or another can specify the user categories by name, associated the name with a user level, and further associate privileges with the categories. For example, a user category can be associated with a camera control time that can be specified in minutes, seconds, hours, or another interval. In the illustrated embodiment, some categories of users can be provided with a privilege of unlimited camera control time, where such control time can be designated in the FIG. 6 embodiment as a "-1," while those of ordinary skill will recognize such designation as merely exemplary.

Other illustrated user category privileges can include an associated ability to usurp control, to set camera presets, to "boot" control from lower level users where "booting" can include causing the current camera controller to be removed from control (e.g., with such control provided to the next user, for example), to allow multiple logins of users, to disallow lower levels of users to view a user ("hidden login privilege"), and to provide enablement of other functions that can be referred to as "advanced" functions. Advanced functions can be representative of other privileges that can relate to, for example, camera configuration parameters (e.g., white balance, gamma, pan-tilt limits, etc.), and other operational and/or configuration features and/or privileges. In an embodiment, another user privilege can include directing video to specified destinations, and such directing can be in addition to, or to the exclusion of, video direction to other destinations.

Accordingly, the methods and systems can allow for a user or another to register with the NOC 12 or another server, where such registration can allow the user to be assigned to or otherwise associated with a user category. In some embodiments, registration can be performed via a wired or wireless communications link using applets and/or other user interfaces to allow the registration information to be provided by the user to the NOC 12 or other server, collectively referred to herein as "the server." Additionally and/or optionally, a system administrator or another can manually enter registration information. Such registration information, whether entered manually and/or automatically, can be processed to manually and/or automatically (e.g., via rules based on the identity information such as email address, etc.) assign a registered user to a user category, and such data can be stored in a database or another memory component, referred to herein as a registration database, that can be accessible to the server. In one embodiment, the registration database can be structured to facilitate queries of the same. The registration database can thus be organized to include identification information from which a user can be identified, and such identification information can vary based on the embodiment, but can include one or more of a user name, a password, biometric data, an email address, or other information that allows identification information. Upon registration, users can specify identification information, and the methods and systems can accept or delete user-specified identification information based on whether such information can uniquely identify such user. A registration module or other process can also include manually and/or automatically associating identification information with a user category. Such association of identification information with a user category can be based on the identification information (e.g., user's name, association with an organization, payment of fees, etc.)

Accordingly, when accessing the NOC 12 or other server, the user can provide identification information such as a user name and/or a password or other identification information specified by an embodiment. In one embodiment, the user can be prompted to provide identification information using for example, a graphical or other interface, and/or in some embodiments, mechanisms such as cookies and/or other identification techniques can be employed to convey identification information. Based on identification information received from the user, the server can query the registration database and determine whether the user is a registered user, and accordingly, whether the user should be associated with a user category. For example, if the identification information does not identify a registered user, the user can be provided with an option to register, and/or an option to be associated with the default anonymous and/or unrecognized user privileges.

Referring again to FIG. 6, such an embodiment allows users that are not known or are otherwise unrecognized to be provided with a default category and/or default set of privileges that can be associated with such default category of user. For example, a user that utilizes a "guest" account or other account that is not associated with identification information, can be considered an "anonymous" user and the illustrated embodiment can allow such user to be provided with default privileges based on a provided user level as shown in FIG. 6. Further, an embodiment according to FIG. 6 can allow users that provide unrecognized identification information (e.g., a query of the registration database did not identify the identification information provided by the user) to be considered to be "unrecognized" users, where such identification information can be used to establish a temporary or other limited user account, for example, that can be associated with a default set of privileges.

Based on a user's level and/or category, and privileges associated with such user level and/or category, a user can be provided with an applet as previously provided herein, where such applet can provide a user interface for allowing or otherwise providing camera control. Such interface can be, for example, an interface according to FIGS. 4, 5A, and 5B, where such interface can allow for variable speed camera control as provided relative to such illustrative user interfaces. In one embodiment, different applets can be associated with different interfaces that can be provided to users based on a user category. For example, an interface associated with one applet can include a user-selectable option to usurp control, where such applet is associated with a user category having usurping privileges. In such an embodiment, a user associated with a user category without usurping control may be provided with an applet that is associated with an interface that does not include a usurping user-selectable option, and/or disables such option. In one embodiment, based on user category, a camera control applet can be provided input values to enable and/or disable the camera control user interface options such that the applet provides the user with options and/or configurations of options (e.g., enable/disable option) compatible with the user category and associated privileges.

One or ordinary skill will thus recognize that the embodiments of the methods and systems described relative to FIG. 6, which include a hierarchical configuration and/or system for categorizing and/or managing camera control users, can be implemented in several different ways. For example, queues can be associated with different categories of users, and such queues can be first-in, first-out (FIFO) queues or other types of managed queues, where such user category queues can be managed using one management method, while a same or different management method can be used across multiple user category queues. For example, although user queues can be managed as FIFO queues, camera control can be determined based on a rotating sequential or random list from the various user category queues. In another embodiment, user category queues can be polled to determine the user from a user category queue that has waited the longest amount of time, regardless of which user category queue such user resides. In one embodiment, a single queue can be used for the different user categories, and such queue can be managed in a FIFO format, for example.

Those of ordinary skill will recognize that the use of the word "queue" as provided herein, should be understood to be an exemplary illustration of a list of associated items (e.g., users, user information, user privileges, user request times, etc.), and the use of the word "queue" should not be understood to be a limitation of a data structure that can be used to implement such association. Accordingly, such association can be performed using data structures such as queues, graphs, databases, tables, linked-lists, and other data structures, with such examples provided for illustration and not limitation.

Those of ordinary skill will also recognize that although some embodiments may provide management systems for user category queues and/or management systems for managing across queues, such management systems may also consider the ability of some users to boot and/or usurp camera control.

The disclosed methods and systems can be included in a system to provide surveillance and/or security to an area, where such area need not be a closed area, although in some embodiments, may include a closed area. In some embodiments, providing security to "an area" can include a system for providing security to multiple areas. The security/surveillance system, referred to herein more generally as a security system, can include, for example, one or more cameras as provided herein, where such camera(s) can be provided according to the illustrative embodiment of FIG. 3, for example, and where such cameras can be remotely located from the user. In one embodiment, the camera(s) can be positioned and/or otherwise configured to allow control of such camera, from a remote or other location, to provide image/video and/or other data associated with an area for which surveillance and/or security is desired. In some embodiments, more than one camera can be configured for collecting image data from a similar area.

Figure 7:
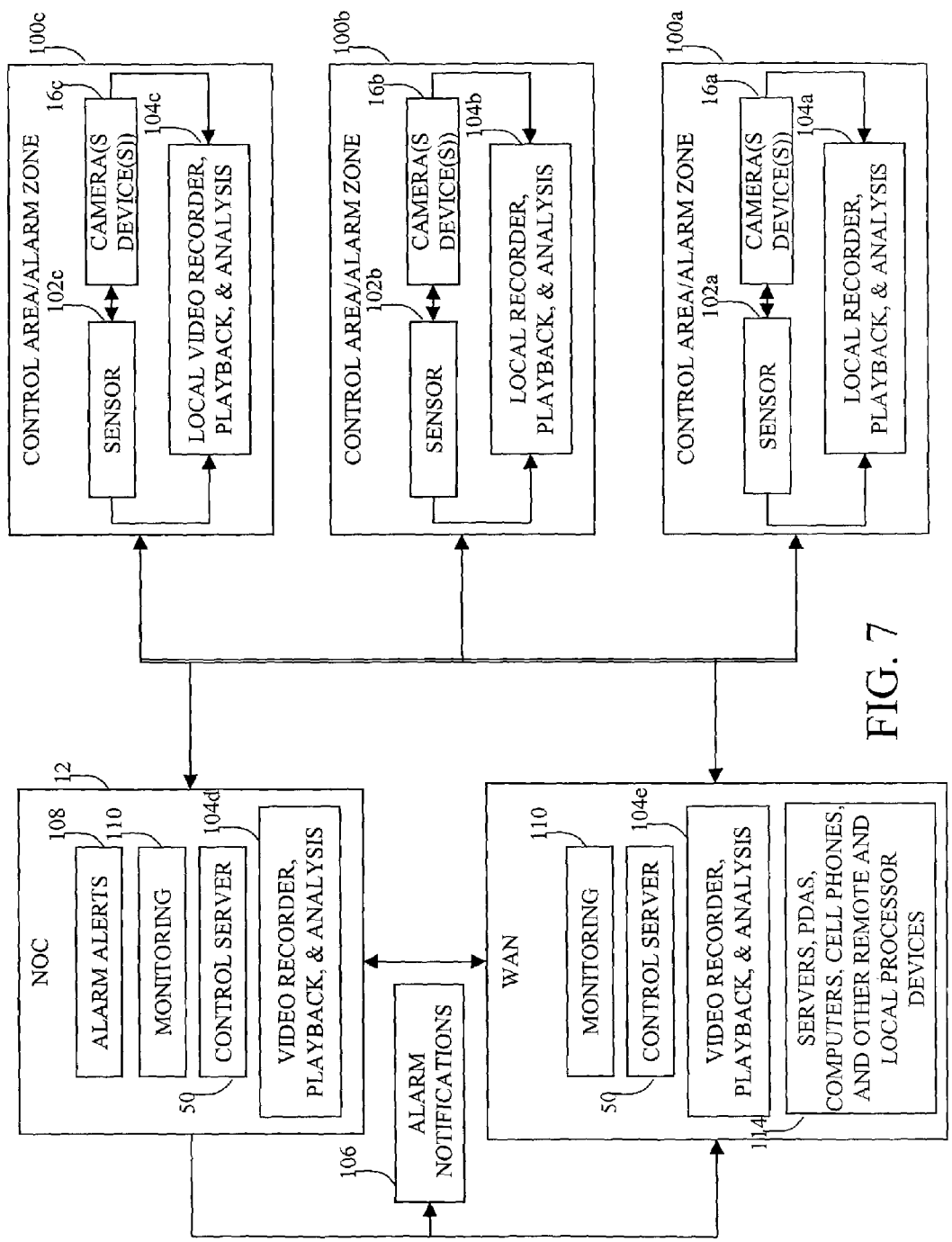
FIG. 7 includes one system for security.

FIG. 7 thus includes one embodiment of the disclosed methods and systems that can include one or more controlled regions 100a, 100b, 100c that can be associated with or otherwise include one or more cameras 16a, 16b, 16c, respectively, one or more sensors 102a, 102b, 102c, respectively, and in the illustrated embodiment, one or more local video recorders, playback means for audio and/or video (e.g., video recorder, VCR, DVD, CD, amplifier, audio and/or video tape player), and analysis modules (e.g., processor with instructions for processing data) 104a, 104b, 104c (such recorders, playback means, and analysis modules referred to collectively herein as "playback systems"), respectively, that can include hardware, software, and a combination of hardware and software. The illustrated sensors 102a-c and cameras 16a-c can thus communicate with the playback systems 104a-c such that, for example, a signal from a sensor 102a-c can cause video/image data to be recorded from a camera 16a-c to a playback system 104a-c. In one embodiment, a signal from a sensor 102a-c can cause the camera(s) 16a-c to be positioned to a fixed or other pre-programmed position, to allow recording of video and other data. In one such embodiment, for example, a camera 16a-c can be configured to be directed to a field of view or other position associated with the sensor 102a-c based on a signal provided by the sensor 102a-c.

The illustrated controlled regions 100a-c can be an area that can be closed, unclosed, that may be defined by a perimeter, by a camera 16 field of view, by a sensor 102, or by another criteria. Accordingly, it can be understood that a controlled region 100a-c can be flexibly interpreted based on the embodiment.

In an embodiment, the sensors 102a-c and cameras 16a-c may not communicate, and accordingly, a signal from the sensors 102a-c can cause the playback systems 104a-c to record data from the current camera positions, or from a camera position that may be associated with a field of view based on the sensor 102a-c, where such field of view may be pre-programmed based on a signal from the sensor 102a-c.

As the FIG. 7 embodiment illustrates, the controlled regions 100a-c can communicate with one or more NOCs 12 as provided herein and as shown in FIG. 7, to include one or more playback systems 104d, a processor module or other device for providing camera control 50, monitoring equipment and/or software that can include televisions and other displays, and means for providing audio and/or visual alarm alerts 108 that can include graphic displays, speakers, and other mechanisms for alerting a user or another at the NOC 12 with regard to a condition of a sensor 102a-c at one or more of the controlled regions 100a-c. In an embodiment, the NOCs 12 may not include a local user; however, in instances where a user can be positioned at a NOC 12, such user may be able to employ the disclosed methods and systems, including the interface provided herein, for example, to control respective cameras 16a-c. Further, the playback system 104d can be configured to record data from one or more of the controlled regions 100a-c and/or communicate with or otherwise receive video and/or audio data from one or more of the local playback systems 104a-c. As previously provided herein, the components of the NOC 12 can include one or more processors and/or one or more devices.

The illustrated NOC 16 can also provide alarm notifications 106 based on alarm alerts and/or other conditions associated with the controlled regions 100a-c, where such conditions and/or alerts can be further based on signals from the sensors 102a-c. Such alarm notifications 16 can be transmitted to, and thus received by specified individuals and/or organizations through wired and/or wireless networks. Such communication of alarm notifications 16, when received, can allow a user or another to access data from the NOC 16 using one or more processor devices 114, such as the user device 62 of FIG. 3. In an embodiment, alarm notifications 106 can include or otherwise be accompanied by other data related to the alarm, such as sensor identification, controlled region identification, local camera/device identification, local playback system identification, and other data. Accordingly, the alarm notification recipient or other can access a controlled region 100a-c directly via a processor controlled device 114, and by employing a user interface for camera control 50 as provided herein relative to FIGS. 2-5, for example, optionally coupled with a hierarchical scheme as provided relative to FIG. 6, gain access to (usurp, boot, etc.) a camera 16a-c and control such camera 16a-c, where video and/or audio data from such camera 16a-c can be recorded locally with the user at local playback system 104e. As FIG. 7 also indicates, the user can also have local monitoring equipment 110 available. The local playback system 102e can thus also communicate with controlled region playback systems 102a-c, and/or the NOC playback system 102d.

The illustrated sensors 102a-c can thus include sensor arrays that can include one or more different types of sensor(s) that can include, for example, one or more motion, thermal, seismic, acoustic, chemical, gas, biological, biometric, radioactivity, flow, and other sensor types. The cameras 16a-c, as provided previously herein, can include infrared, low light, thermal imaging, underwater, and other camera types.

In one embodiment, the sensors 102a-c can be understood to be associated with one or more processors and/or memory components (e.g., database(s)) that can reside locally or remote to the sensors 102a-c. For example, in one embodiment, a sensor 102a-c can be or otherwise include a processor and instructions, and can include, for example, instructions for performing facial recognition such that data from an associated camera 16a-c can be provided to the sensor 102a-c, either directly or via a playback system 104a-c, such that the sensor 102a-c (e.g., facial recognition instructions) can determine whether the camera's image/video data can be associated with a recognized person, and provide a corresponding alarm in specified circumstances. Those with ordinary skill will thus recognize that the sensors 102a-c can include other sets of instructions for performing other types of analysis (e.g., voice recognition, motion detection, image processing, etc.).

As provided previously herein, the disclosed security systems such as the illustrative FIG. 7 embodiment, can be combined with the hierarchical camera control systems provided according to FIG. 6, such that controlled regions 100a-c can be associated with user groups, and a controlled region 100a-c can be associated with a hierarchical control that may be different from a hierarchical control for another controlled region 100a-c. Further, a user may be associated with more than one controlled regions 100a-c such that a user may be provided different user privileges based on controlled region 100a-c. In some embodiments, different cameras 16a-c within a controlled region 100a-c can be associated with different hierarchical schemes. Accordingly, in an embodiment, when a user provides identification information, such identification information can be associated with a controlled region 100a-c and/or camera 16a-c within a controlled region 100a-c such that the user can be provided with appropriate camera control privileges based on the controlled region 100a-c and/or camera 16a-c.

As provided previously herein, the disclosed methods and systems can include a user privilege for directing video to one or more specified destinations. In one embodiment when such privilege can be incorporated with or otherwise included in the security systems as provided herein, a user may prevent video from being directed to users with the exception of one or more specified destinations (e.g., control user, police, fire, emergency, and/or other destinations) and/or the control user may cause the video to be additionally directed to such other specified destinations. In some embodiments, the methods and systems can allow a privileged user to block video and/or audio to one or more specified users.

Those of ordinary skill with also understand that the disclosed methods and systems include can include an interface that is not illustrated, where such interface may provide a user with a list of available cameras and/or other device 16, 166 to control, where such list can also be associated with a controlled region 100a-c in some embodiments. As provided herein, such selection of a camera and/or other device 16, 166 can be communicated to the web server 64 or other server such that an appropriate applet 66 can be provided to the user based on, for example, the camera/device 16, 166 and/or other associated user privileges.

Those of ordinary skill will thus understand that the disclosed methods and systems can thus also be applied to other applications, including corporate and/or distance learning, telemedicine, webcasting, and other applications, to allow remote control of cameras. Further, although the illustrated embodiments include examples where a camera(s) is controlled via the illustrative interface of, for example, FIGS. 4, 5A, and 5B, one or more of the cameras may include other devices that can be controlled by the interface, where such devices can be characterized by at least partial control based on pan and/or tilt commands (e.g., instructions and/or data). Some examples of other devices thus can include one or more spotlights, one or more antennas (Radar, communications, and other antenna), one or more missile and/or gun turrets, and other devices that can be at least partially controlled based on pan and/or tilt commands, with the exemplary embodiments provided herein for illustration and not limitation.

Figure 8:
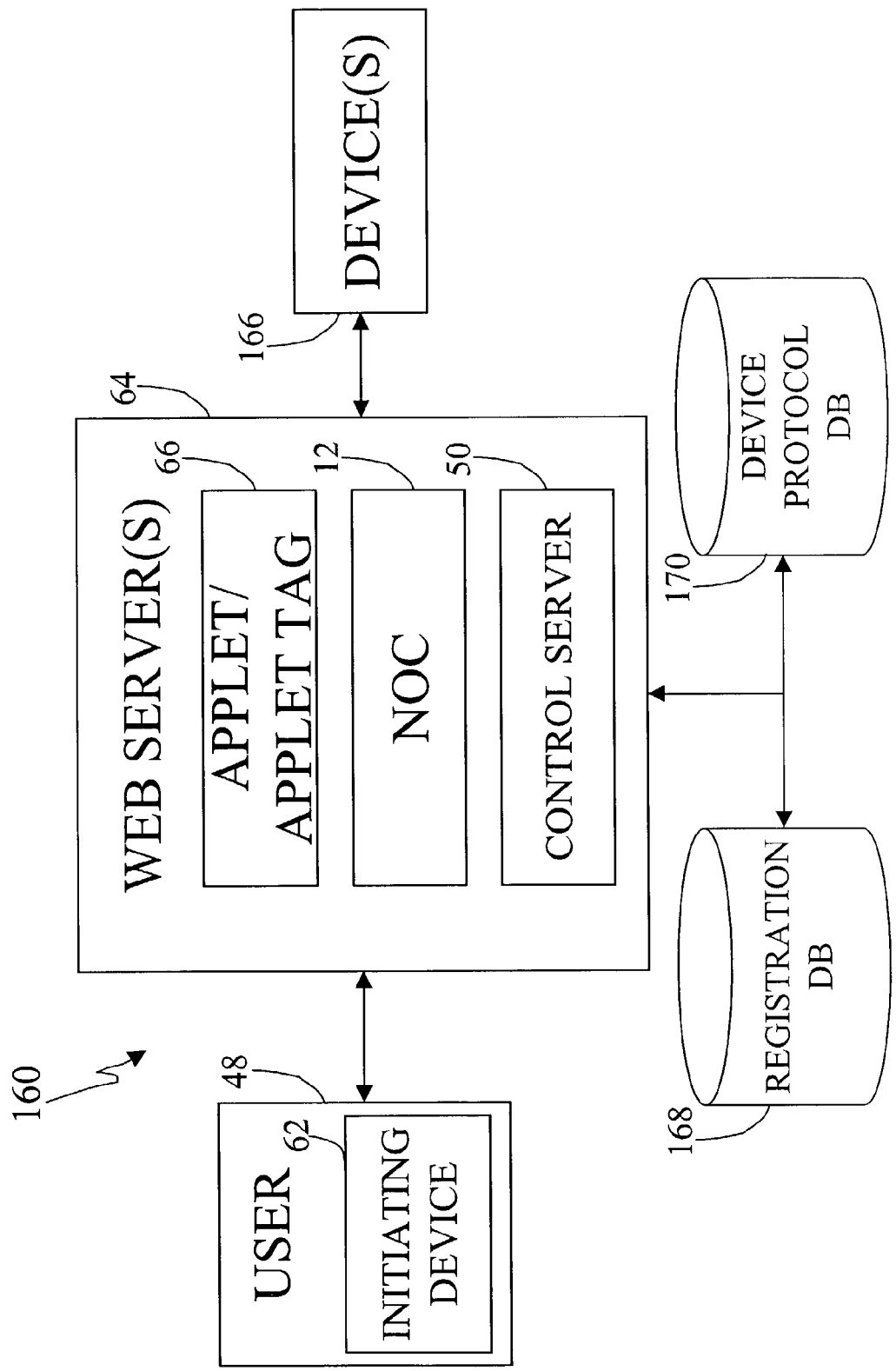
FIG. 8 provides another embodiment of the disclosed methods and systems.

The disclosed methods and systems thus can be understood to include an embodiment according to the illustrative embodiment 160 of FIG. 8 that can be based on, for example, FIG. 3, while the illustrated device 166 of FIG. 8 can include the camera 16 of FIG. 3, but can also include other devices as provided herein, that can be controlled at least in part based on pan and/or tilt commands. The FIG. 8 embodiment 160 also includes a registration database 168 as provided previously herein, and a device protocol database 170. Those of ordinary skill will recognize that the illustrated databases 168, 170 can be combined, integrated, or otherwise separated to include one or more databases.

The illustrated registration database 168 can include registration information associated with the user 48, including for example, user identification information. Based on user identification information, device 166 identity, and/or other data or information provided by the user device 62, where such data can be associated with the user's selection of a device 166, the registration database can also associate the user with a user category, level, and/or privileges as provided herein. It can be recognized that a user that is associated with a user category for one device 166 may not be recognized with a user category for another device 166, and thus although a user 48 may have many privileges for one device 166, the same user 48 may have default privileges when selecting another device 166. Based on such user privileges and/or category, as provided herein, the user 48 and/or user device 62 can be provided with an applet and/or applet tag 66 that can provide the user 48 with such privileges.

The FIG. 8 embodiment also includes a device protocol database 170 that can also be organized and/or queried based on the device 166 selected by the user 48 and/or data or other information from the user device 62 that can identify a selected device 166. Based on data retrieved from the device protocol database 170, where such data is associated with the selected device 166, control data received from the user 48 via, for example, the user device 62 and/or applet 66, can be provided to the control server 50 and at least pan and/or tilt commands from the user device 62 can be transformed, translated, or otherwise converted or provided to the device 166 in a manner that is consistent with the device protocol, including a device driver associated with the device 166. Accordingly, a system administrator associated with the FIG. 8 device protocol database 170 can provide such database 170 with data and/or other information based on the various devices 166, device locations (e.g., controlled region 100a-c), and other data and/or information that can allow pan and/or tilt commands from the user 48 to be converted to commands, data, and/or other information that can be employed by the device 166. Those of ordinary skill will thus recognize that the disclosed methods and systems allow users to control devices of different types, different protocols, etc., using a single interface. Those of ordinary skill with thus understand that the user privileges as provided herein with respect to cameras (e.g., directing video and/or audio, redirecting video and/or audio, restricting video and/or audio, etc.), can be understood to be with respect to data from the device 166, based on the type of device; therefore, references herein to video and/or audio can be understood generally to include references to data from the device 166.

Accordingly, in an embodiment according to FIG. 8 where the devices 166 are cameras, the device protocol database 170 can include protocols for different cameras, thus enabling the ability to maintain cameras 166 with of different types and/or protocols, and to change camera types (or change to other devices), while the user interface to the user remains substantially the same (e.g., may be reconfigured based on the options available at the device).

Those with ordinary skill in the art will recognize that the methods and systems disclosed herein can be platform independent and can operate using a variety of operating systems. As indicated previously, the methods and systems can also be independent of the camera. As indicated herein, in some embodiments, a user can be provided with a choice of cameras from which to select, wherein the several cameras can be positionally distinct.

What has thus been described are methods and systems for providing an interface to allow a user to control a camera with variable speed control via the interface. Such interface can allow multiple users to control a single camera, and accordingly, users can be classified into user categories and assigned privileges based on user category. The disclosed methods and systems also include surveillance and/or security systems in which cameras can be remotely controlled, where such cameras can be in communications with local sensors to allow remote control of the cameras based on alarms associated with the sensor data, for example.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked enviromnent, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer (s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

Although the methods and systems have been described relative to a specific embodiment thereof, they are not so limited. Obviously many modifications and variations may become apparent in light of the above teachings. For example, as indicated previously herein, multiple cameras can be controlled by a single user, and the multiple cameras can be of different types with different connections (wired, wireless, satellite, infrared, laser, etc.) between the user and the camera or intermediate elements between the user and camera(s). Although the interface presented herein for camera control included a GUI with a cursor, other interfaces can be utilized that do not utilize a cursor for camera control, and can use other graphics or schemes to provide and/or demonstrate control features. Although the illustrated interface included an origin designation in the center of the interface, the origin can be at a different location in the interface. Furthermore, in some embodiments, an origin designation may not be included, and cursor activation can occur by, for example, clicking a computer mouse in the control area. Although the illustrated interface also included buttons for increasing and decreasing focus and zoom, other methods for generating focus and zoom commands can be provided. The user interface can be, for example, text-based or menu driven in some embodiments, rather than graphical.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A system, the system comprising,
   at least one controlled region,
   at least one camera associated with the at least one controlled region,
   a processor-controlled user device, the user device having an interface by which a user can select one of the at least one camera, and provide variable speed control commands over a network to the selected camera, and
   at least one sensor associated with the at least one controlled region, wherein the sensor is separate from the camera,
   wherein the system is adapted to enable the user to usurp control of the selected camera from another user.

2. A system according to claim 1, where the at least one sensor includes a processor and processor instructions.

3. A system according to claim 1, where the at least one sensor communicates with at least one of: the at least one camera, and at least one playback system.

4. A system according to claim 1, where the at least one camera can be positioned based on a signal from the at least one sensor.

5. A system according to claim 1, where the at least one camera can be associated with instructions to position the camera based on a signal from the at least one sensor.

6. A system according to claim 1, further including at least one playback system associated with the at least one controlled region.

7. A system according to claim 1, further including at least one of: at least one video recorder, at least one audio recorder, at least one playback video means, at least one playback audio means, and at least one analysis module.

8. A system, the system comprising:
   at least one controlled region,
   at least one camera associated with the at least one controlled region,
   a processor-controlled user device, the user device having an interface by which a user can select one of the at least one camera, and provide variable speed control commands over a network to the selected camera,
   wherein the interface is adapted to provide to the user privileges that are based on and vary according to at least one of: the user device, the user, the at least one controlled region, and the at least one camera, and
   wherein the system is adapted to enable the user to usurp control of the selected camera from another user.

9. A system according to claim 1, where the interface includes configurable options based on at least one of: information associated with the user, the at least one controlled region, and the at least one camera.

10. A system according to claim 1, further including at least one database to associate a user with at least one of: identification information and privileges.

11. A system according to claim 10, where the identification information can include at least one of a user name, a password, and biometric data.

12. A system according to claim 10, where the privileges can be based on at least one of: the at least one controlled region and the at least one camera.

13. A system according to claim 1, further including:
   at least one database to associate the at least one camera with at least one protocol, and,
   instructions for causing data from the user device to be provided to the at least one camera based on the at least one protocol.

14. A system, the system comprising:
   at least one controlled region,
   the at least one camera associated with the at least one controlled region,
   a processor-controlled user device, the user device having an interface by which a user can select one of the at least one camera, and provide variable speed control commands over a network to the selected camera, and
   at least one non-camera device associated with the at least one controlled region, the at least one non-camera device at least partially controlled by the interface,
   wherein the system is adapted to enable the user to usurp control of at least one of the selected camera and the at least one non-camera from another user.

15. A system according to claim 14, further including:
   at least one database to associate the at least one non-camera device with at least one protocol, and,
   instructions for causing data from the user device to be provided to the at least one non-camera device based on the at least one protocol.

16. A system according to claim 1, where the interface includes a display.

17. A system according to claim 1, where the interface includes at least one of a graphical user interface, a database interface, a scripting interface, a menu driven interface, and a text-based interface.

18. A system, the system comprising:
at least one controlled region,
at least one camera associated with the at least one controlled region,
a processor-controlled user device, the user device having an interface by which a user can select one of the at least one camera, and provide variable speed control commands over a network to the selected camera,
wherein the interface includes a control area, where commands based on at least one of pan and tilt commands are provided to the at least one camera based on a relative position of a cursor in the control area,
wherein the system is adpted to enable the user to usurp control of the selected camera from another user.

19. A system according to claim 18, where the relative position of the cursor is based on an initial cursor position.

20. A system according to claim 18, where the relative position of the cursor is based on an origin of the control area.

21. A system according to claim 1, where the variable speed control commands are based on:
an origin, and
a user-designated distance from the origin.

22. A system according to claim 21, where the origin is at least one of: a designated location, and an initial contact location selected by the user.

23. A system, the system comprising:
at least one controlled region,
at least one sensor associated with the at least one controlled region,
at least one controlled region device associated with the at least one controlled region, the controlled region device being controlled at least in part by at least one of pan and tilt commands, the at least one controlled region device being separate from the at least sensor,
at least one alarm associated with the at least one sensor, and,
a processor-controlled user device for receiving an alarm notification based on the at least one alarm, the user device having an interface by which a user can select one of the at least one controlled region device, and provide commands based on at least one of variable pan and tilt commands over a network to the selected controlled region device,
wherein the system is adapted to enable the user to usurp control of the selected controlled region device from another user.

24. A system according to claim 23, where the at least one sensor includes at least one of: at least one facial recognition system, at least one image processing instruction, at least one motion sensor, at least one thermal sensor, at least one seismic sensor, at least one acoustic sensor, at least one chemical sensor, at least one gas sensor, at least one biological sensor, at least one biometric sensor, at least one radioactivity sensor, and at least one flow sensor.

25. A system according to claim 23, where the controlled region device includes a microprocessor-controlled device.

26. A system according to claim 23, where the interface is adapted to provide to the user privileges that vary from user to user that are based on user privileges associated with the user.

27. A system according to claim 23, where the interface can be based on at least one of: the controlled region associated with the selected controlled region device, the user device, and the selected controlled region device.

28. A system according to claim 23, where the interface includes an origin, and the at least one of the pan and tilt commands are based on a user-designated distance from the origin.

29. A system according to claim 23, where the interface includes an origin, and where the origin is at least one of: a designated location, and an initial contact location selected by the user.

30. A system according to claim 23, where the at least one controlled region device includes at least one of: a camera, a gun turret, a missile turret, a spotlight, and an antenna.

31. A system according to claim 23, where the interface includes at least one option to perform at least one of: usurp control, boot control, direct data from the selected controlled region device and redirect data from the selected controlled region device.

32. A method, comprising:
providing at least one controlled region, the at least one controlled region associated with at least one controlled region device,
providing at least one interface to allow at least one user to:
select one of the at least one controlled region devices, and,
generate at least one of pan and tilt commands,
where the at least one interface is provided on a processor-controlled user device, the at least one interface having an origin, where the pan and tilt commands are based on a user-selected distance from the origin, and
converting the generated pan and tilt commands to control the selected controlled region device,
wherein the system is adapted to enable the user to usurp control of the selected controlled region device from another user.

33. A method according to claim 32, further including associating at least one sensor with the at least one controlled region.

34. A method according to claim 33, further comprising providing at least one of an alarm and an alarm notification to the at least one user, the at least one alarm and alarm notification based on the at least one sensor.

35. A method according to claim 32, further comprising, associating at least one sensor with the at least one controlled region,
based on data from the at least one sensor, providing at least one of an alarm and an alarm notification to the at least one user, the at least one alarm and alarm notification to identify at least one of: the controlled region associated with the at least one sensor on which the at least one alarm and alarm notification are based, and at least one device associated with the controlled region associated with the at least one sensor on which the at least one alarm and alarm notification are based.

36. A method according to claim 32, where the interface includes at least one control to perform at least one of: usurp control of the selected controlled region device, boot a user from control of the selected controlled region device, redirect data from the selected controlled region device, and direct data from the selected controlled region device.

37. A method according to claim 32, where the at least one sensor includes at least one of: at least one facial recognition system, at least one image processing instruction, at least one motion sensor, at least one thermal sensor, at least one seismic sensor, at least one acoustic sensor, at least one chemical sensor, at least one gas sensor, at least one biological sensor, at least onebiometric sensor, at least one radioactivity sensor, and at least one flow sensor.

38. A method according to claim 32, where the interface is adapted to provide to the user privileges that are based on at least one of: the controlled region associated with the selected controlled region device, the user device, user privileges, and the selected controlled region device.

39. A system according to claim 32, where the at least one controlled region device includes at least one of: a camera, a gun turret, a missile turret, a spotlight, and an antenna.

40. A system according to claim 1, wherein the variable speed control commands include commands that increases a magnitude of the speed of at least one of a pan and a tilt of the camera in correlation to varying user input, the varying user input including spatial movement of an input device where increased spatial movement corresponds to increased camera speed.

41. A system according to claim 23, wherein the variable pan and tilt commands include commands that increases a magnitude of a speed of at least one of pan and a tilt of the camera in correlation to varying user input, the varying user input including spatial movement of an input device where increased spatial movement corresponds to increased camera speed.

42. The method of claim 32, wherein the variable pan and tilt commands include commands that increases a magnitude of a speed of at least one of pan and a tilt of the camera in correlation to varying user input, the varying user input including spatial movement of an input device where increased spatial movement corresponds to increased camera speed.

* * * * *